Jan. 19, 1926. 1,570,397
C. S. PRESTON
TIRE VALVE
Filed Nov. 1, 1924 2 Sheets-Sheet 1
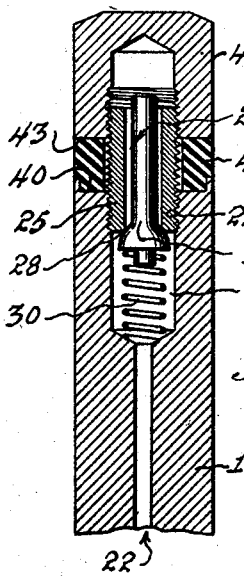
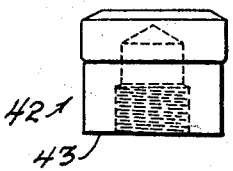
Fig. 4.
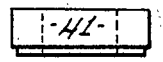
Fig. 5.
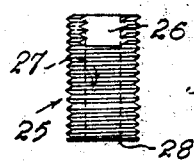
Fig. 6.
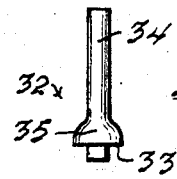
Fig. 7.
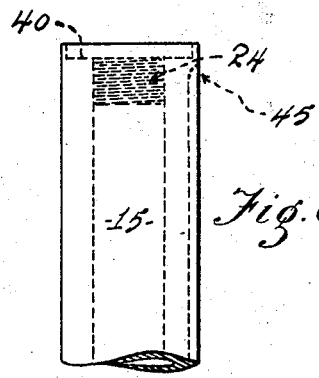
Fig. 8.
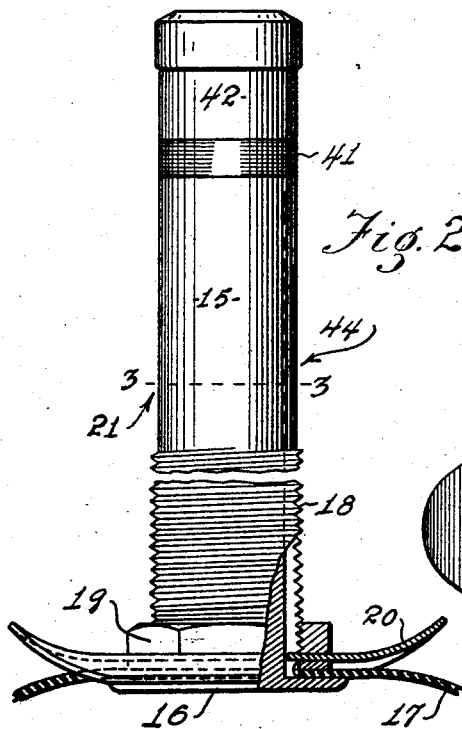
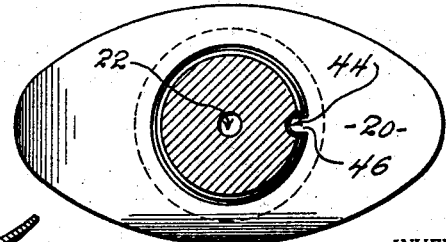
Fig. 3.
INVENTOR:
C. S. Preston.
BY
ATTORNEY.

Jan. 19, 1926. 1,570,397
C. S. PRESTON
TIRE VALVE
Filed Nov. 1, 1924 2 Sheets-Sheet 2

INVENTOR.
C. S. Preston.
BY
ATTORNEY.

Patented Jan. 19, 1926.

1,570,397

UNITED STATES PATENT OFFICE.

CLARENCE S. PRESTON, OF SAN DIEGO, CALIFORNIA.

TIRE VALVE.

Application filed November 1, 1924. Serial No. 747,198.

*To all whom it may concern:*

Be it known that I, CLARENCE S. PRESTON, a citizen of the United States, and a resident of San Diego, in the county of San Diego and State of California, have invented new and useful Improvements in Tire Valves, of which the following is a specification.

The present invention relates to inflator valves for the inner tubes of pneumatic tires, and has for its principal object the provision of more economical construction and maintenance.

It will be understood in the consideration of the invention that an inner tube inflator valve comprises many essential and accessory parts, including the usual valve body or stem, a removable core composed of several delicate or non-metallic parts, an auxiliary cap intended to hold any air which may leak through the valve core, and an outside dust cap screw threaded over the valve body or stem.

It is therefore another object of the invention to provide for a reduced number of parts.

Another object, in view of the foregoing, is to provide for making the inner parts of the valve of more substantial construction.

Still another object of the invention is to reduce the cost of maintenance by providing a construction which will permit of the use of metal in place of rubber.

Another object of the invention is to provide a valve of the above mentioned type in which tendency to leakage is reduced to a practical minimum if not entirely eliminated.

Still another object of the invention is to reduce the amount of time required to test, or test and fill a pneumatic tire.

Another object of the invention is to provide a valve of the above type which will operate and function in substantially the usual manner, but which is practically immune from damage by the air hose or other apparatus commonly used to inflate inner tubes.

In addition to the foregoing, other objects and numerous advantages of my invention will appear hereinafter and will be better understood because of the order in which they appear.

I have illustrated by the accompanying drawings a preferred embodiment of my invention, and a modification thereof and in the said drawings;

Figure 1, is a view in enlarged vertical section of the upper end of one practical embodiment of my invention.

Figure 2, is a view in side elevation thereof of the complete embodiment of my invention as it appears attached to an inner tube of an automobile tire.

Figure 3, is a view in section on a line 3—3 of Fig. 2.

Figures 4, 5, 6, 7 and 8, respectively, are views in elevation of the principal parts of the said embodiment as they appear in successive dissembled relationship.

Figure 9:
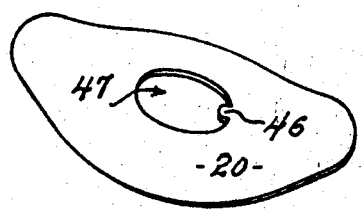

Figure 9, is a view in perspective of a part hereinafter known as the inner tube guard.

Figure 10:
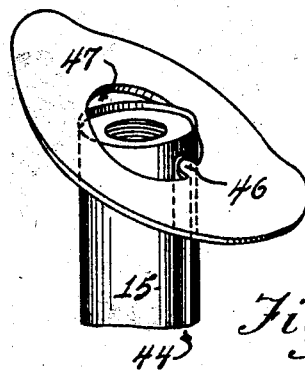

Figure 10, is a perspective showing the guard and the upper end of the valve body to illustrate the manner in which the guard may be attached to the valve.

Figure 11:
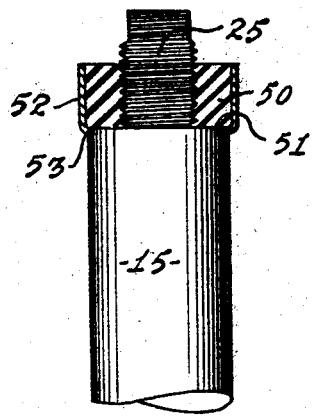

Figure 11, is a view partially in vertical section of a modified form of the invention.

Figure 12:

Figure 12, is a perspective of a part of the modified form.

Figure 13:

Figure 13, is a view in elevation of the upper end of said embodiment as it appears completely assembled.

In carrying out my invention in the embodiments shown, I provide a vertical stem 15, which I will hereinafter refer to as the valve body. Said body terminates in the usual flanged end 16, whereby it is adapted for permanent connection with an inner tubing 17. In conformance with the usual practice, the lower portion, at least, of the body is provided with external screw threads 18 for the receipt of nuts, such as 19. Nut 19 is placed immediately above the tube guard 20, and serves to hold the tube guard and rubber of the inner tube securely between itself and the lower flanged end for the usual and well understood purposes.

A salient feature of the valve body resides in the omission of threads at the upper end, the surface being of smooth and finished appearance, as at 21. The external threads are carried only high enough to provide for using a usual nut (not shown) to hold the stem located in the wheel felly (not shown). The improved valve illustrated requires no outside cover or dust cap, as will be particularly apparent hereinafter, and thus a reduction in the cost of manufacture of a complete valve is effected.

The valve body is provided with a central bore 22, which is enlarged at the upper end, as at 23. The valve body is of normal or standard diameter, and the upper end 23 of the bore 22 is internally threaded, as at 24 to receive a nipple 25. Said nipple provides the standard reduce upper end common to usual valve bodies for pneumatic tires, and provides means for attachment with an air hose or the like (not shown). In conformance with another salient feature of my invention, said nipple is provided with flats 26, whereby a wrench, a pair of pliers, or like tools (not shown) may be employed to install or remove said nipple.

The nipple is provided with a through bore 27, which terminates at the lower end in a tapered valve seat 28. Below the nipple and within the bore of the body there is provided a spring 30. Between the spring and the nipple there is provided a valve member 32 having a spring seat 33 and a stem 34. The spring and spring seat tend to hold the valve member centrally located and the spring is designed to hold the valve upon its seat with slight pressure to insure its return when it is depressed. The valve member is provided with a hemispherical valve disc 35, which coacts with the valve seat to provide an air tight joint. While it is well known that a small metallic valve of this type is not a perfect retainer of compressed air, it will be apparent hereinafter that perfection is not sought for or required in so far the valve disc and seat are concerned.

The internal threads provided for receipt of the nipple terminate abruptly so that the nipple can be screwed in only a given distance. Very slight leakage may take place around the threads, but it will also be apparent hereinafter that such leakage will not effect the efficiency of the complete embodiment of the invention. Obviously, a tube equipped with my improved valve may be filled, emptied or tested in the usual manner; the stem to which the valve disc is attached being arranged to project beyond the nipple, as shown in Fig. 1.

The body terminates in a smooth upper surface or shoulder 40, coming at the intersection of the nipple and body. Said shoulder may be at the extreme upper end of the body or may be counter-sunk, as shown in the preferred embodiment. A rubber or composition washer or gasket 41 is provided to fit in the recessed end of the body and to rest upon said shoulder. Said gasket should be of a material which is not greatly distorted under moderate pressure.

For screw threaded engagement with the upper end of the nipple, there is provided a cap 42, having a smooth under surface or seat 43. Said cap is adapted to coact with the surface 43 to provide against the escape of air therebetween. Likewise, the surface 40 coacts with the rubber gasket to provide against leakage between such surface and the said gasket. Air which might escape by the valve could not escape to the atmosphere by way of the threads around the nipple. Likewise, air cannot escape down and under the cap. Therefore, even should the valve leak, and even should the joint between the nipple and body-threads leak, still no air would actually escape from the interior of the valve body, provided the cap is securely screwed down upon its gasket.

In usual practice provision is made for placing the tube guard in position by sliding it over the stem while precluding its turning upon said stem. In conformance with such practice, but contrary to usual construction, the valve body is left full round, but is provided with a vertical slot 44. Said slot terminates just below the upper end of the body, as indicated at 45, so that it does not break through the seat upon which the rubber gasket rests.

Accordingly the tube guard is formed so that a lug or projection 46 extends inwardly into the usual central aperture 47 thereof. Said aperture is slightly larger than the smooth upper end of the valve body, but is only provided with the necessary clearance to slide over the threaded portion of the lower end of the valve body. By tilting the guard slightly (see Fig. 10) it may be passed over the upper end of the valve body while at the same time the lug is caused to enter the vertical slot. Subsequently the guard may be moved to a true horizontal position in which it may be lowered upon the body to its normal position. Once the tube guard is so placed around the valve body or stem it is precluded from turning thereon, and is therefore always held in longitudinal alignment with the tube, as practice requires.

In considering the practical operation of my improved valve, it will be immediately apparent that air may be caused to enter readily but is checked from escape; the valve member coacting with the seat to provide a nonreturn valve. To inflate a tube equipped with the complete embodiment, the cap is first removed. A gauge (not shown) may be applied to the extended end of the valve member in the manner common to usual valves to test the pressure of air contained in said tube. When the tube is filled, the nonreturn function of the valve tends to prevent escape of the contained air. The valve, as well as the joint between the nipple and valve body may give rise to slight leakage. However, the valve cap should be applied immediately. By suitably grasping the upper knurled end of the cap it may be applied against the gasket with considerable pressure. The result is an air tight connection which prevents escape of air from the tube or valve body, even though the valve member itself be imperfectly seated.

The entire assembly is equally as neat in appearance as any unit over which a dust cap is placed. In addition, it is a positive means for preventing slow leaks through valves. Should the valve member or seat become very inefficient or worn, either or both may be replaced. Likewise the washer. The cap, gasket, nipple, valve member, and spring may be successively removed in the order named.

In the form of the invention shown in Figs. 11 to 13 inclusive, a gasket 50 is provided which sets on a smooth seat 51. Said gasket, in this instance, may be a more resilient composition of rubber. To retain same against lateral displacement under pressure, I provide a metal ring or annulus 52, having a slightly cupped lower end 53. The rubber gasket should be of slightly larger diameter than the valve body and should fit snugly but removably in said cupped ring. The smallest diameter of the lower open end of the ring, as indicated at 53, should be such that it just fits over the valve body. The cap is of such diameter as to fit into the open upper end of the ring, in event the rubber should be compressed sufficiently to allow it to do so.

In the use of this form of the invention, the cap is screwed down against the resilient gasket and the latter is compressed in and into the cup-like member 52. Said member precludes lateral displacement of the rubber and provides a reenforcement and protection therefor. The rubber may be removed from the member 52 and be replaced as often as required, while the member 52 itself may last indefinitely.

It will be apparent now that I have provided, among other things, a simple, durable, rugged, efficient and readily renewed valve assembly for pneumatic tire tubes, and while I have shown and described a specific embodiment of my invention and a modification thereof, I do not limit myself to any specific construction or arrangement of parts, and may alter the construction and arrangement of parts as I desire or as occasion requires without enlarging the scope of my invention, within the appended claims.

I claim:

1. In a device of the class described, a valve body provided with a small central bore, a deep counter-bore at the upper end of the body providing a spring seat at its intersection with the smaller bore, threads in said counter-bore terminating at a point appreciably above the said seat, an externally threaded nipple screwed into the bore as far as the threads permit; said body terminating at its upper end in a gasket surface, a soft gasket reposing on said surface and encompassing the nipple; the nipple extending beyond the gasket, means associated with the nipple to facilitate tightening in, or removal from, the body; the nipple providing a central bore and a valve seat at the lower end of the bore, a metallic valve stem extended through said bore and protruding from the upper end, a metallic integral enlargement to the lower end of the stem capable of seating on said valve seat, a spring compressed between said enlargement and the spring seat for holding the said enlargement up against the valve seat; the nipple and stem being devoid of means for centering the stem, and a cap having an internally threaded bore of such depth as to permit of being screwed down over the nipple to compress the gasket; the threads in the cap and bore, and the threads on the nipple, all coacting in conformance with the character of the gasket to provide for the nipple being secured to the body more firmly than it is normally possible to secure the cap to the nipple with the gasket in place.

2. In a device as in claim 1; said gasket being sufficiently soft to tend to bulge outwardly when compressed, and a metal ring encompassing said gasket externally to direct the displacement of rubber inwardly.

3. In a device of the class described, a valve body provided with an internally threaded central bore, an externally threaded nipple removable in said bore; said nipple being held in said bore solely by interengagement of the threads, a valve within said bore seating on the inner end of said nipple; the body terminating in a surface adapted to receive a gasket and the nipple extending well beyond such surface, a soft rubber gasket fitted around said nipple and resting on said surface, a cap adapted to be screwed down over the upper end of said nipple to compress the gasket on the surface; said gasket being sufficiently soft to tend to bulge outwardly unduly when the cap is in air tight relation to the nipple, and nonexpansible means surrounding the gasket to direct the displacement of the rubber inwardly.

CLARENCE S. PRESTON.